United States Patent [19]
Kii et al.

[11] Patent Number: 5,995,966
[45] Date of Patent: Nov. 30, 1999

[54] ELECTRONIC COMMUNICATION SYSTEM AND RECORDING MEDIUM

[75] Inventors: Takahiro Kii; Kazuhiro Ohishi; Kyoko Okuyama, all of Kawasaki, Japan

[73] Assignee: Fujitsu Limited, Kawasaki, Japan

[21] Appl. No.: 09/030,944

[22] Filed: Feb. 26, 1998

[30] Foreign Application Priority Data

Oct. 20, 1997 [JP] Japan ................................ 9-287476

[51] Int. Cl.⁶ .................................................. G06F 17/30
[52] U.S. Cl. .................... 707/10; 707/103; 395/200.36
[58] Field of Search ................. 707/10, 103; 395/200.36

[56] References Cited

U.S. PATENT DOCUMENTS

| | | | |
|---|---|---|---|
| 4,856,066 | 8/1989 | Lemelson | 381/36 |
| 5,754,939 | 5/1998 | Herz et al. | 455/4.2 |
| 5,796,948 | 8/1998 | Cohen | 395/200.36 |
| 5,835,087 | 11/1998 | Herz et al. | 345/327 |

*Primary Examiner*—Thomas G. Black
*Assistant Examiner*—Frantz Coby
*Attorney, Agent, or Firm*—Staas & Halsey

[57] ABSTRACT

An electronic communication which gives a user a sense of affinity to the system and occasions the user's interest and participation will in the communication, by preparing a sentence filled with the user's attribute information such as a name, hobby, and scheduled events of the belonging group, and information which changes with time such as weather, then outputting the sentence as characters, or by offering news selected by the user from among automatically displaying miniature images, for example, as identification information of the news which is presumed to highly interest the user based on the information such as a hobby included in the user's attribute information.

5 Claims, 12 Drawing Sheets

FIG. 3

USER INFORMATION DB

| USER ID | FULL NAME | BELONGING GROUP | BIRTHDAY | HOBBY | SEX |
|---|---|---|---|---|---|
| aaaa | ○○○○ | △△PRIMARY SCHOOL | 1990.09.02 | SOCCER | MALE |
| | | | | | |

GROUP INFORMATION DB

| GROUP NAME | EVENT1 | EVENT2 |
|---|---|---|
| △△PRIMARY SCHOOL | 09.24:TRIP | 10.10:SPORTS MEETING |
| | | |

GENERAL INFORMATION DB

| ITEM | CONTENTS |
|---|---|
| WEATHER | 1997.09.22FINE,1997.09.23CLOUDY,1997.09.24FINE,.... |
| | |

FIG. 4

SENTENCE PATTERN TABLE

| KEYWORD | SENTENCE PATTERN |
|---------|------------------|
| EVENT | (Attrib1)(Keyword) is(Attrib 2). |
| NAME | Hello,(Attrib1)(Keyword).Today is(Attrib 2). |

KEYWORD-ATTRIBUTION TABLE

| KEYWORD | ATTRIB 1 | ATTRIB 2 | ATTRIB 3 | ATTRIB 4 | ..... |
|---------|----------|----------|----------|----------|-------|
| EVENT | DATE | WEATHER | — | — | |
| NAME | SEX | WEATHER | — | — | |

SENTENCE COMPOSITION RULE TABLE

| ATTRIBUTION | RULE |
|-------------|------|
| DATE | (KEYWORD DATE)−(TODAY'S DATE)=if 0 then "Today" |
| | =if 1 then "Tomorrow" |
| | ... |
| SEX | if male then "Mr." |
| | if female then "Ms." |
| | ... |

FIG. 9

USER INFORMATION DB

| USER ID | FULL NAME | BELONGING GROUP | BIRTHDAY | HOBBY | SEX | FRIEND |
|---|---|---|---|---|---|---|
| aaaa | ○○○○ | △△PRIMARY SCHOOL | 1990.09.02 | SOCCER | MALE | BBBB |
| | | | | | | |

NEWS INFORMATION DB

| NEWS ID | TOPIC | NUMBER OF READERS | REPUTATION | MINIATURE IMAGE |
|---|---|---|---|---|
| N-1 | GAME | 100 | ◎ | MINIATURE OF N-1 |
| N-2 | SOCCER | 30 | △ | MINIATURE OF N-2 |
| | | | | |

MAIL INFORMATION DB

| MAIL ID | ARRIVAL DATE | SENDER | MINIATURE IMAGE |
|---|---|---|---|
| M-1 | 1997.10.10 | BBBB | MINIATURE OF M-1 |
| | | | |

ELECTRONIC COMMUNICATION SYSTEM AND RECORDING MEDIUM

BACKGROUND OF THE INVENTION

The present invention relates to an electronic communication system for transmitting and receiving electronic messages such as electronic news, electronic mail, etc. in a network such as the Internet, and a recording medium readable with a computer used in the electronic communication system.

An electronic communication system becomes widespread where opinions are exchanged with many people by transmitting and receiving electronic news and electronic mails by utilizing the network such as the Internet, personal computer communication, etc.

Although such electronic communication system is much utilized for the business use, it is the present condition that the users such as children or aged persons having scarce familiarity with the computer are negative to participate in the communication.

In the electronic communication system, the news are classified into certain categories to support the user's search. However, the users have to find out the information of own interest by selecting the category. This nuisance is one of the causes to prevent the participation of the users having scarce familiarity with the computer such as children or aged persons in the communication.

BRIEF SUMMARY OF THE INVENTION

The present invention has been made to settle such problems. An object of the invention is to provide an electronic communication system and a recording medium which give the user a sense of affinity with the electronic communication system and serve to arouse the user's interest and will to participate in the communication by preparing sentences incorporated with attribute information of the user such as the name, hobby, schedule of events in the belonging group, information which changes with time such as weather, etc. and outputting the sentence as, for example, characters, and by automatically displaying a miniature image, for example, as the identification information of the news in which the user is presumed to have a high interest based on information such as a hobby which is included in the user's attribute information and offering the news corresponding to the identification information selected by the user out of the displayed ones.

In the invention, a sentence containing personal contents is prepared by incorporating attribute information related to the user such as a name, birthday, hobby, belonging group, event of the belonging group, etc. in a sentence composition pattern and is outputted.

In the invention, general information necessary for composing a sentence other than attribute information related to the user is stored, and a sentence incorporated with the general information corresponding to information such as the date of birth, event of belonging group, etc. included in the attribution information related to the user is prepared and outputted.

By the above, the invention gives the user a sense of affinity with the electronic communication system and arouses the user's interest and participation will in the communication.

Also, in the invention, there is outputted only the identification information such as miniature images which identify the news which the user is highly interested in and have relations with the user's attribute information such as a hobby out of the news posted to the system, and the news corresponding to the identification information selected by the user out of the outputted ones is obtained from storage means such as the news server.

By the above, the user can have a look at the identification information of the news highly interested in without performing a special operation, and further can obtain the desired news by a simple operation of selecting out of the displayed information, so that the will to participate in the communication is aroused.

The above and further objects and features of the invention will more fully be apparent from the following detailed description with accompanying drawings.

BRIEF DESCRIPTION OF THE SEVERAL VIEWS OF THE DRAWING

FIG. 3 is a conceptual view of the data base of Embodiment 1;

FIG. 4 is a conceptual view of the sentence composition data table of Embodiment 1;

FIG. 9 is a conceptual view of the data base of Embodiment 2;

DETAILED DESCRIPTION OF THE INVENTION

Embodiment 1

Figure 1:
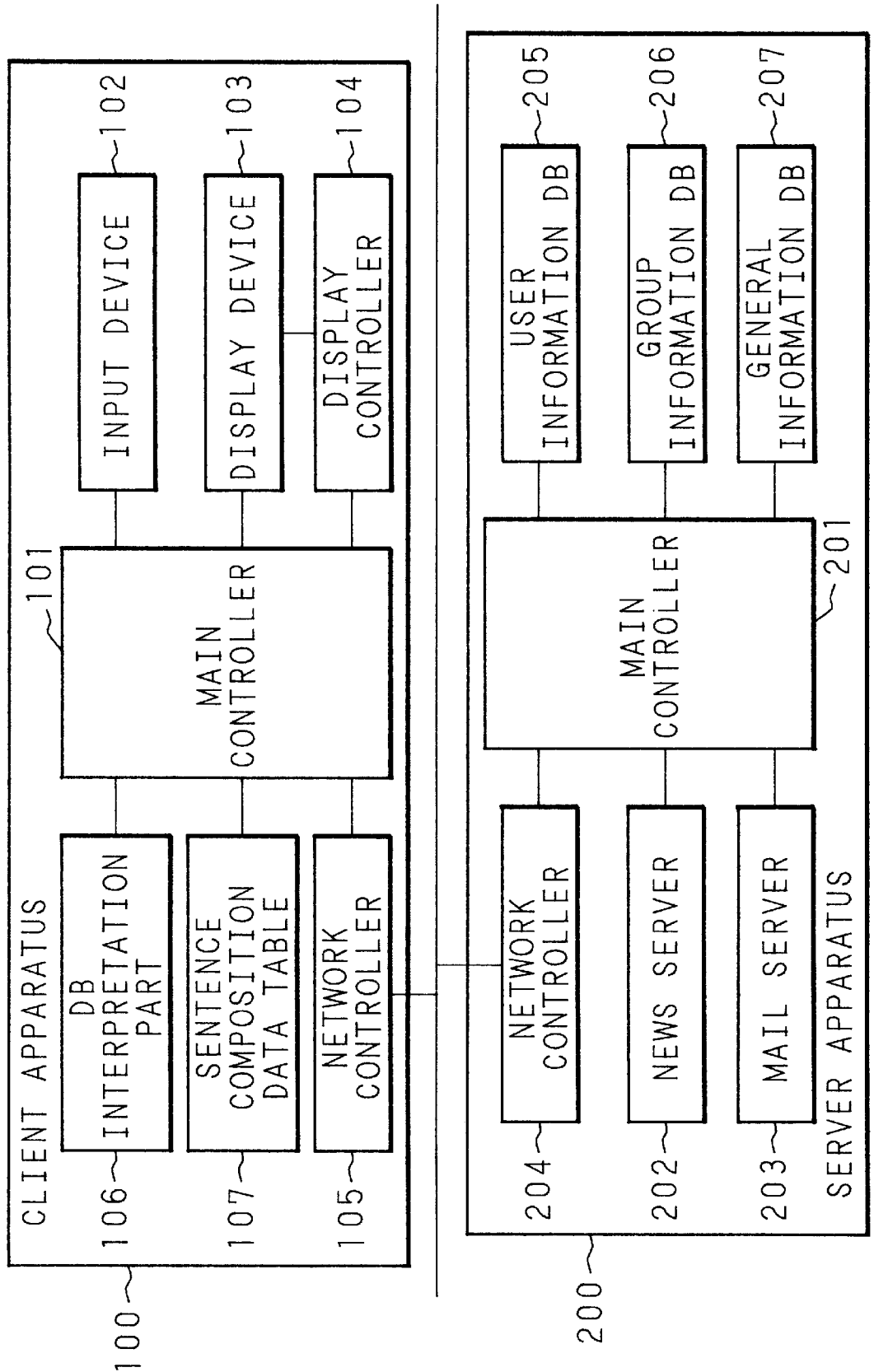
FIG. 1 is a block diagram showing Embodiment 1 of the invention.

FIG. 1 is a block diagram showing Embodiment 1 of the electronic communication system of the invention.

The client apparatus 100 is equipped with: a main controller 101 for controlling an operation of each part and a transfer of data between the parts; input device 102 such as a mouse, keyboard, etc.; display device 103 including a display and a speaker as output devices; a display controller 104 for controlling the data output to the display device 103; a sentence composition data table 107 (ref. FIG. 4) storing sentence composition data for composing a sentence by obtaining the necessary information from various data bases of a server apparatus 200 to be described later, for the purpose of giving an unexpected feeling and a sense of affinity with the communication system to the user and arousing the user's interest and will for participation in the communication; a DB interpretation part 106 for preparing a sentence including personal contents of the user by referring to the sentence composition data table 107; and a network controller 105 for controlling communication procedures with the network. The client apparatus 100 is connected with the server apparatus 200 through the network.

Figure 2:
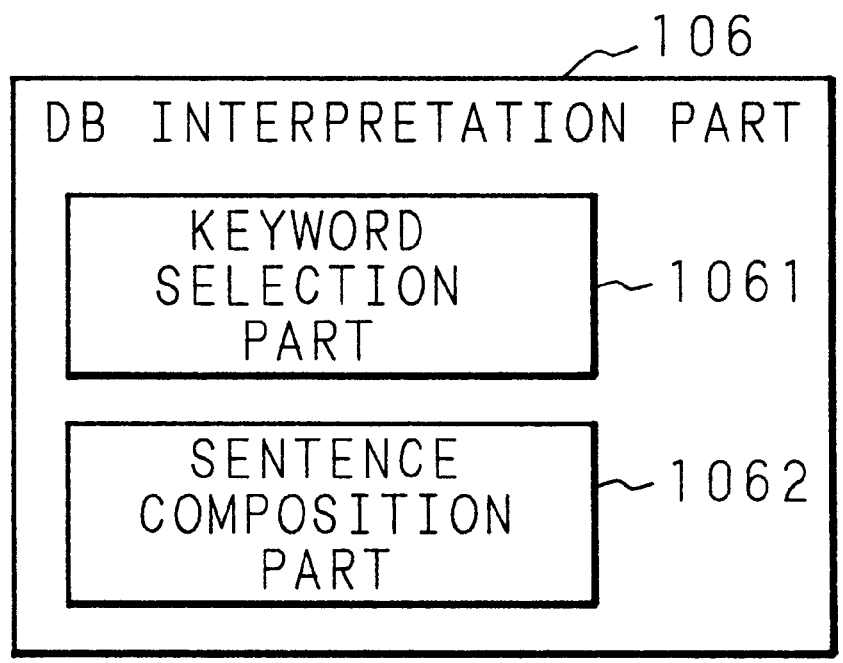
FIG. 2 is a block diagram of the DB interpretation part in Embodiment 1.

FIG. 2 is a detailed block diagram of the DB interpretation part 106.

It comprises a keyword selection part 1061 for selecting items of attribute information related with the user which becomes a keyword for determining a composition pattern of the sentence to be composed, in order or at random on each occasion of preparing the sentence, for example, and a sentence composition part 1062 for composing the sentence by incorporating the personal information of the user in the composition pattern of the sentence suited to the keyword selected by the keyword selection part 1061 on referring to the sentence composition data table 107.

The server apparatus 200 comprises a main controller 201 for controlling an operation of each part and a transfer of data between the parts, a news server 202 for storing and managing the substantial information of the news, a mail server 203 for memorizing and managing the substantial information of the mail, and a network controller 204 for controlling the communication procedures with the network.

The server apparatus 200 further comprises a user information DB (data base) 205 which stores user attribute information such as an ID, name, belonging group, birthday, hobby, sex (age), and the like of the user registered in advance by the user, a group information DB 206 which stores user attribute information such as information of the activities of the group to which the user belongs (time/date and kind of event), and a general information DB 207 which stores information by dates which varies in time such as a weather in the user's residing place obtained from the outside periodically. FIG. 3 is a conceptual view of the data bases 205, 206, and 207 in Embodiment 1 of the server apparatus 200.

FIG. 4 is a conceptual view of the sentence composition data table 107 in Embodiment 1.

A sentence composition pattern table stores sentence composition patterns for composing the sentence incorporated with the user's attribute information by items of the attribute information which becomes the keyword for the sentence to be composed.

A keyword attribute table stores the items of the attribute information (date, weather, sex, etc.) necessary for composing the sentence suited for the contents of the keyword.

A sentence composition rule table stores the words and sentences suited to the attribute information such as date, sex, etc. for the case of not incorporating the attribute information without a change in the sentence pattern.

Figure 5:
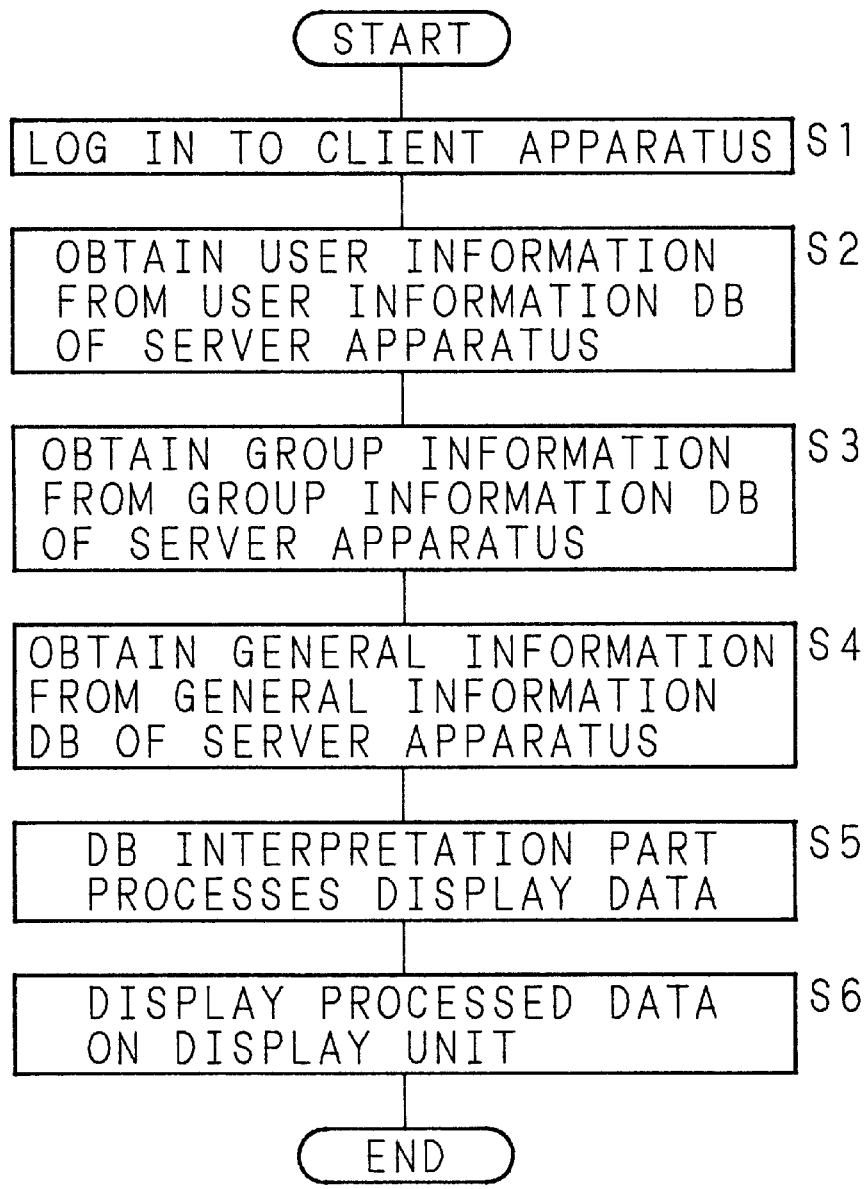
FIG. 5 is a flow chart (No. 1) of the operation of Embodiment 1.
Figure 6:
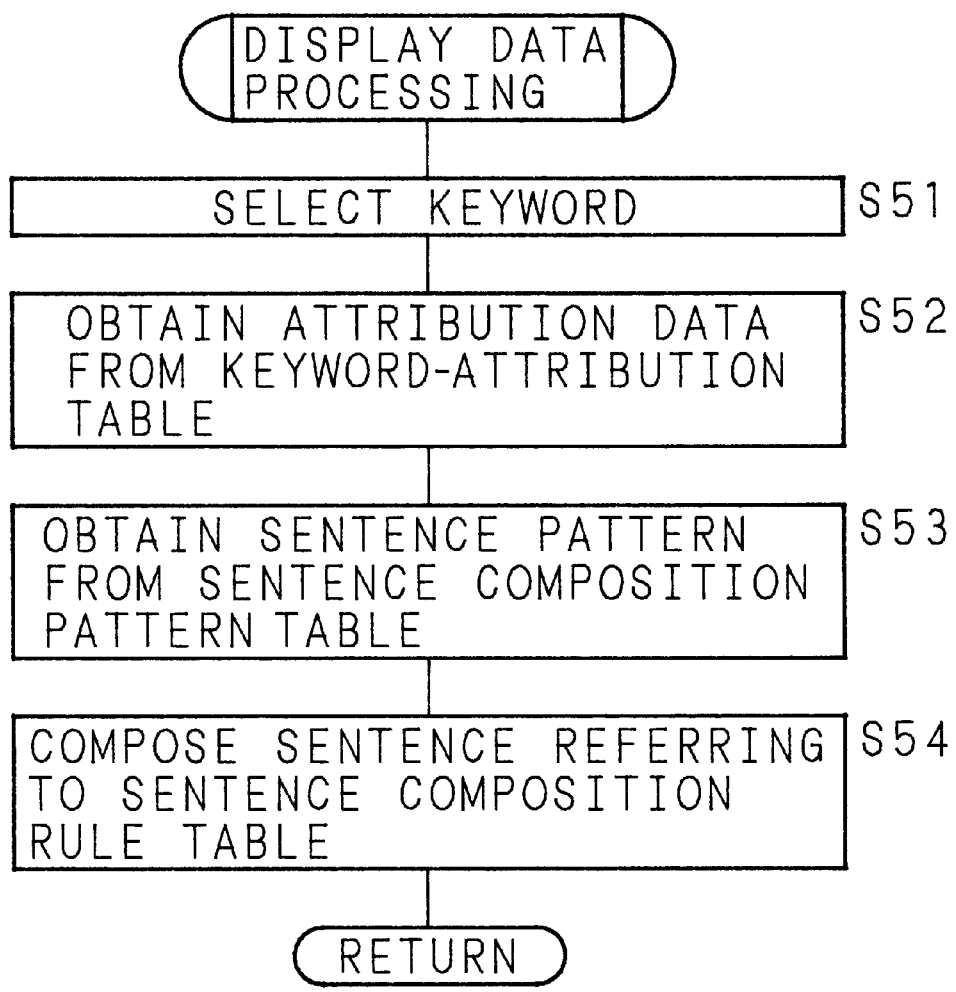
FIG. 6 is a flow chart (No. 2) of the operation of Embodiment 1.

Next, the operation of Embodiment 1 taking an example of the case where the message is displayed immediately after the logging in the communication system from the client apparatus by the user, will be explained on the basis of the flow charts of FIGS. 5 and 6 and the drawing to show an example of the screen display of FIG. 7.

When the user logs in to the communication system by inputting the user ID, password, etc. through the input device 102 of the client apparatus 100 (Step S1), the user ID is transmitted to the network controller 204 of the server apparatus 200 from the network controller 105 of the client apparatus 100.

The server apparatus 200 searches the user information DB 205 using the received user ID as a key (Step S2). Next, by using the name of the group to which the user belongs as a key, the server apparatus 200 searches the group information DB 206, and obtains the group information such as the date, kind, etc. of the event of the group to which the user belongs (Step S3). The server apparatus 200 further searches the general information DB 207 by using the information at a predetermined time such as the date of the event as a key, and obtains the general information such as a weather (Step S4). The server apparatus 200 transmits the obtained information to the client apparatus 100.

The DB interpretation part 106 of the client apparatus 100 analyzes the transmitted information by referring to the sentence composition table 107 and processes the sentence of the message which is to be displayed (Step S5).

The DB interpretation part 106 selects any of the items of the attribute information according to the predetermined order or at random as a keyword for the message to be prepared (Step S51), and obtains the item of the attribute information related with the selected keyword from the keyword attribute table and obtains the attribute information of the corresponding item (Step S52).

For example, in case "Event 1" is selected as a keyword, the items of "date" (Attribute 1) and "weather" (Attribute 2) are obtained from the keyword attribute table. Using these items as keys, the DB interpretation part 106 obtains the date and kind of the Event 1 in the group information DB 206 and the weather information at the date of the event in the general information DB 207.

Next, the DB interpretation part 106 obtains the sentence pattern from the sentence composition pattern table according to the selected keyword (Step S53) and composes the sentence by incorporating the attribute information (Step S54). In this case, depending on the item of the attribute information, the DB interpretation part 106 refers to the sentence composition rule table to obtain other words or another sentence corresponding to the attribute information and incorporate the obtained words or sentence in the sentence composition pattern.

For example, in case of "date", depending on the difference between the date of today and the date of the event, the words "today", "tomorrow" and "day after tomorrow" are incorporated in the sentence composition pattern in place of the date per se.

Figure 7:
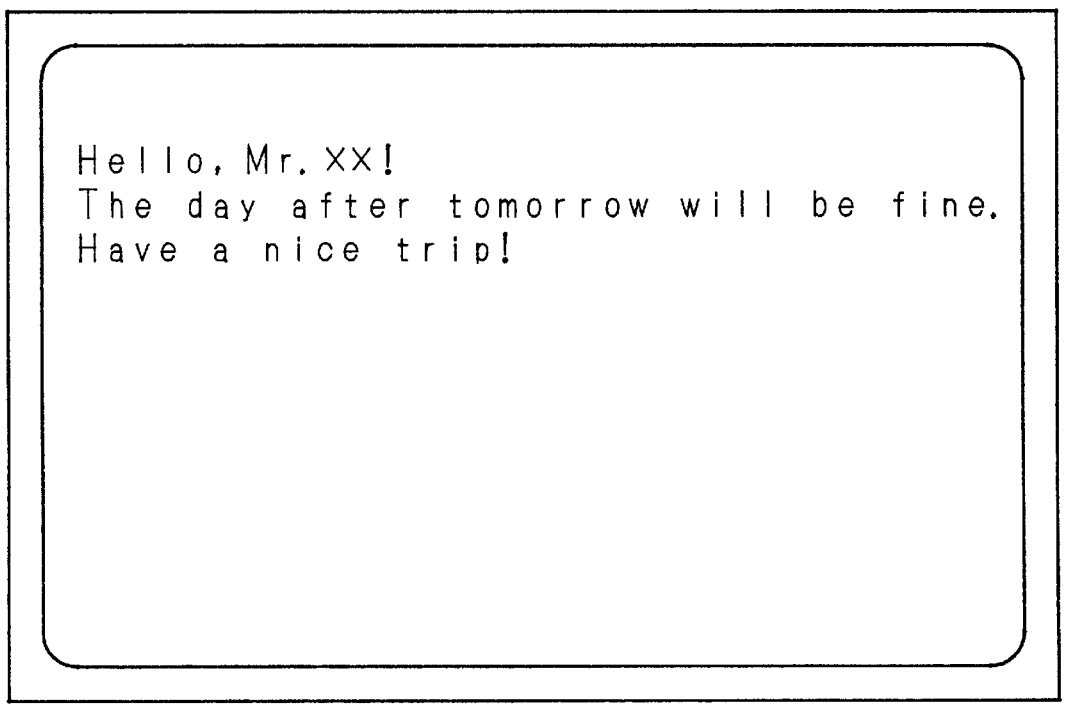
FIG. 7 is a view showing an example of screen display in Embodiment 1.

The DB interpretation part 106 transfers the prepared sentence data to the display controller 104, and the display controller 104 displays the message data as shown in FIG. 7 on the display screen as the display device 103 (Step S6).

In Embodiment 1, there is given an example where the DB interpretation part 106 and the sentence composition data table 107 are provided on the client apparatus 100, but they may be provided on the server apparatus 200.

Embodiment 2

Figure 8:
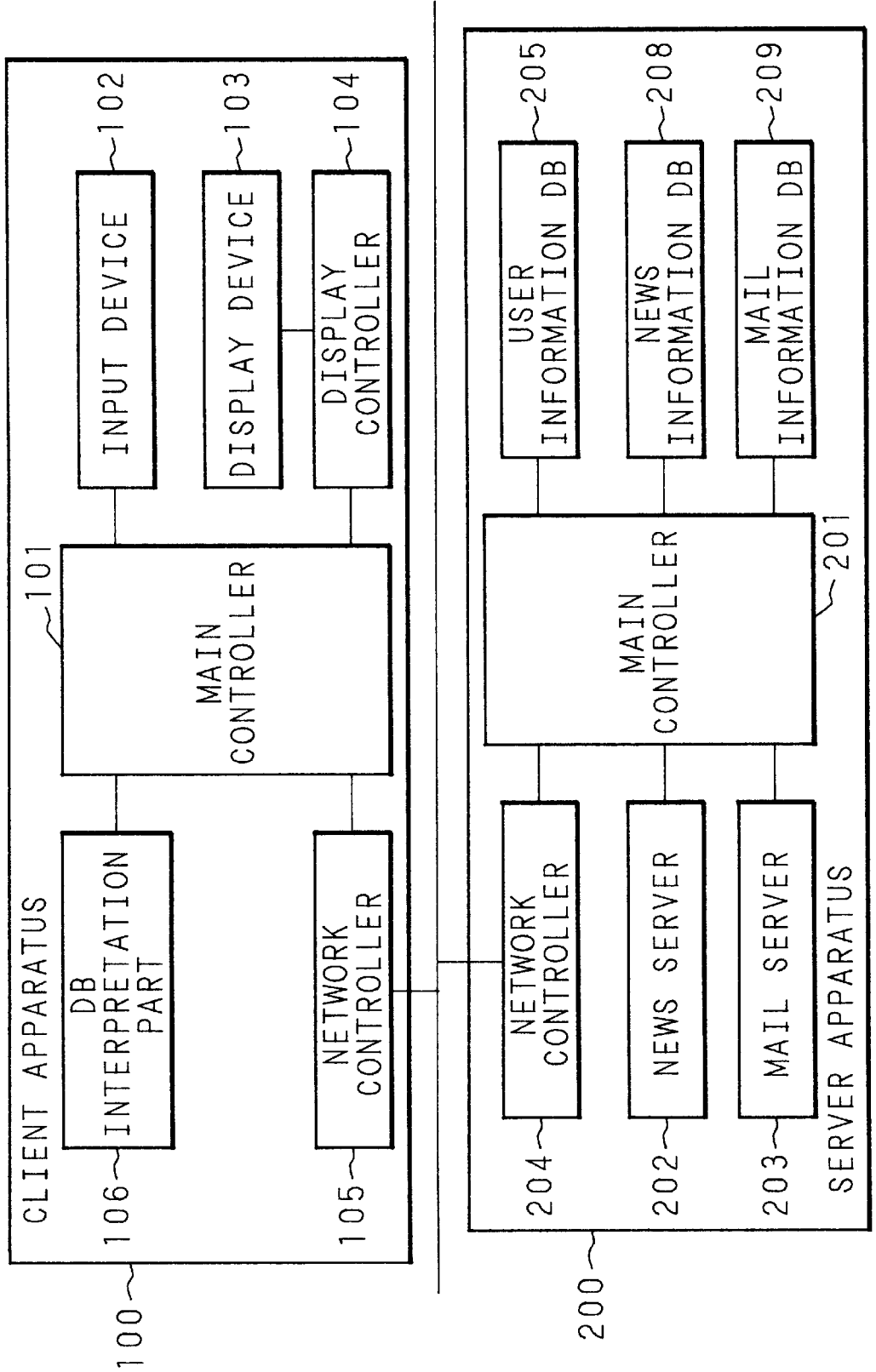
FIG. 8 is a block diagram of Embodiment 2 of the invention.

FIG. 8 is a block diagram of Embodiment 2 of the electronic communication system of the invention. The same or corresponding parts to Embodiment 1 of FIG. 1 are indicated with the same marks and the explanation thereon is omitted.

The server apparatus 200 of this embodiment comprises a user information DB 205 similar to that of Embodiment 1, a news information DB 208 which stores by news IDs miniature image data (or storage address thereof) of the news to be outputted to the display device 103 of the client apparatus 100 as identification information for identifying the news substance stored in the news server 202 and the attribute information of the news comprising the news topics, number of readers, and level of reputation, and a mail information DB 209 which stores by mail IDs the date of arrival, sender, miniature image data (or storage address thereof) of the mail to be outputted to the display device 103 of the client apparatus 100 as the identification information for identifying the mail substance which is stored in the mail server 203.

FIG. 9 is a conceptual view of the data bases 205, 208, and 209 in Embodiment 2.

The interpretation part 106 of the client apparatus 100 obtains from the news information DB 208 and mail information DB 209 the miniature image data of the news and mail corresponding to the user's attribute information such as a hobby stored in the user information DB 205, adds message data, for example, and transfers it to the display controller 104, to have the display device 103 display the miniature image and, if there is message data, the message.

The main controller 101 of the client apparatus 100 stores the display position and size of the displayed miniature image, news ID, and mail ID, and transmits to the server apparatus 200 the news ID or mail ID corresponding to the miniature image selected by the user by a click operation or the like out of the data displayed on the display device 103 to obtain the news or mail corresponding to the selected miniature image from the news server part 202 or mail server 203 of the server apparatus 200, and displays the news or mail on the display of the display device 103.

Figure 10:
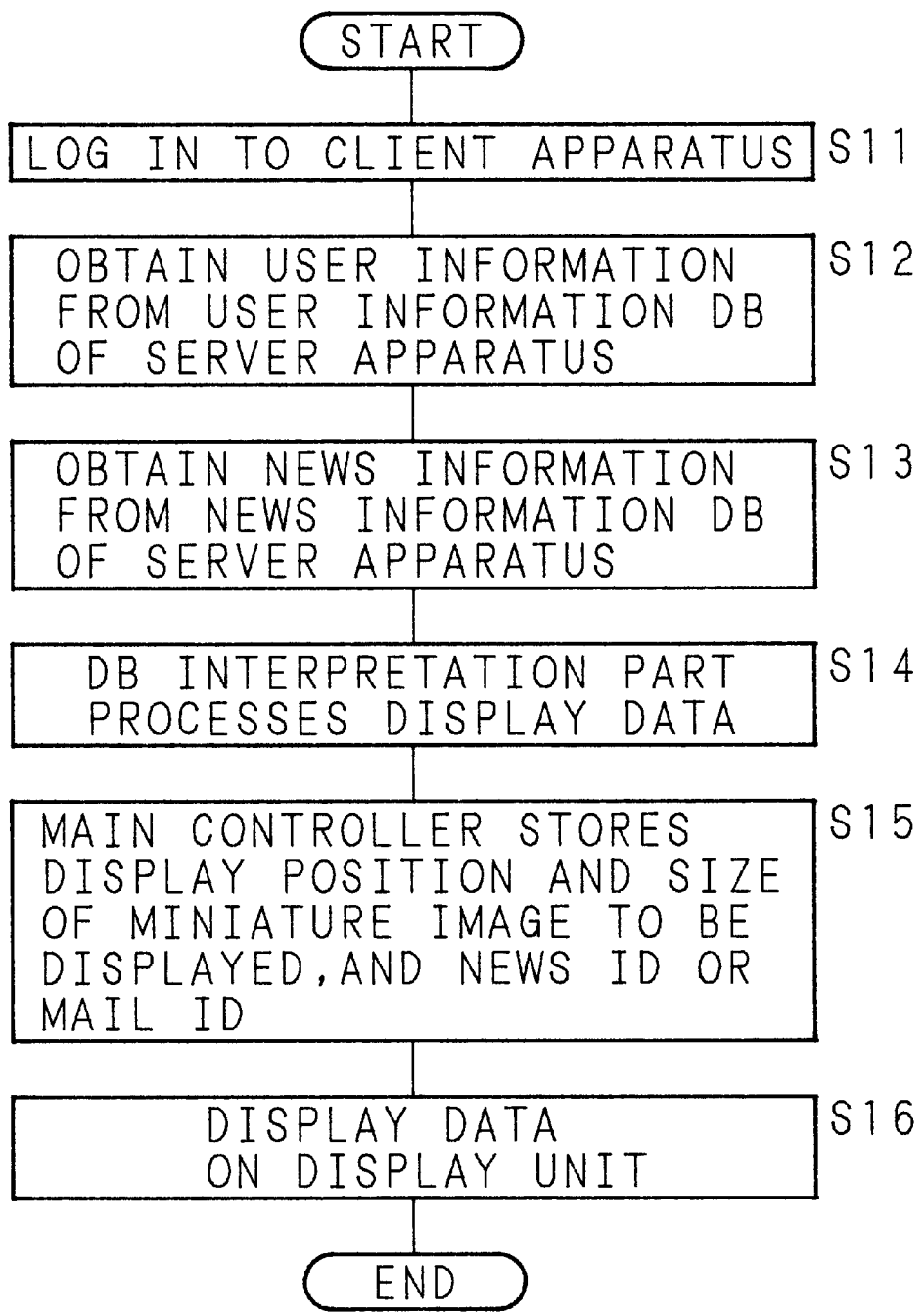
FIG. 10 is a flow chart of operation of Embodiment 2.

Next, the operation of Embodiment 2 will be explained on the basis of the flow chart of FIG. 10 and the example of the screen display of FIG. 11, taking an example of the case where the miniature image is displayed immediately after the user logged in the communication system from the client apparatus.

When the user inputs the user ID, password, etc. from the input device 102 of the client apparatus 100 and logs in the communication system (Step S11), the user ID is transmitted to the network controller 204 of the server apparatus 200 from the network controller 105 of the client apparatus 100.

The server apparatus 200 searches the user information DB 205 using the received user ID as a key and obtains the attribute information such as a hobby, for example, which shows the degree of the user's interest in the information (Step S12). Next, the server apparatus 200 obtains the miniature image data of the news e.g., relating to the hobby, in which the user has a high interest from the news information DB 208, and the mail from a friend or the newly arrived mail, for example, in which the user has a high interest from the mail information DB (Step S12, S13). The server apparatus 200 transmits the obtained information to the client apparatus 100.

The DB interpretation part 106 of the client apparatus 100 processes the display information such as to determine the display position of the transmitted miniature image and to add the message data (Step S14). The main controller 101 stores the display position and size of the miniature image to be displayed, news ID or mail ID (Step S15), and transfers the display information to the display controller 104. The display controller 104 displays the display information on the display screen of the display device 103 as shown in FIG. 11 (Step S16).

Figure 11:
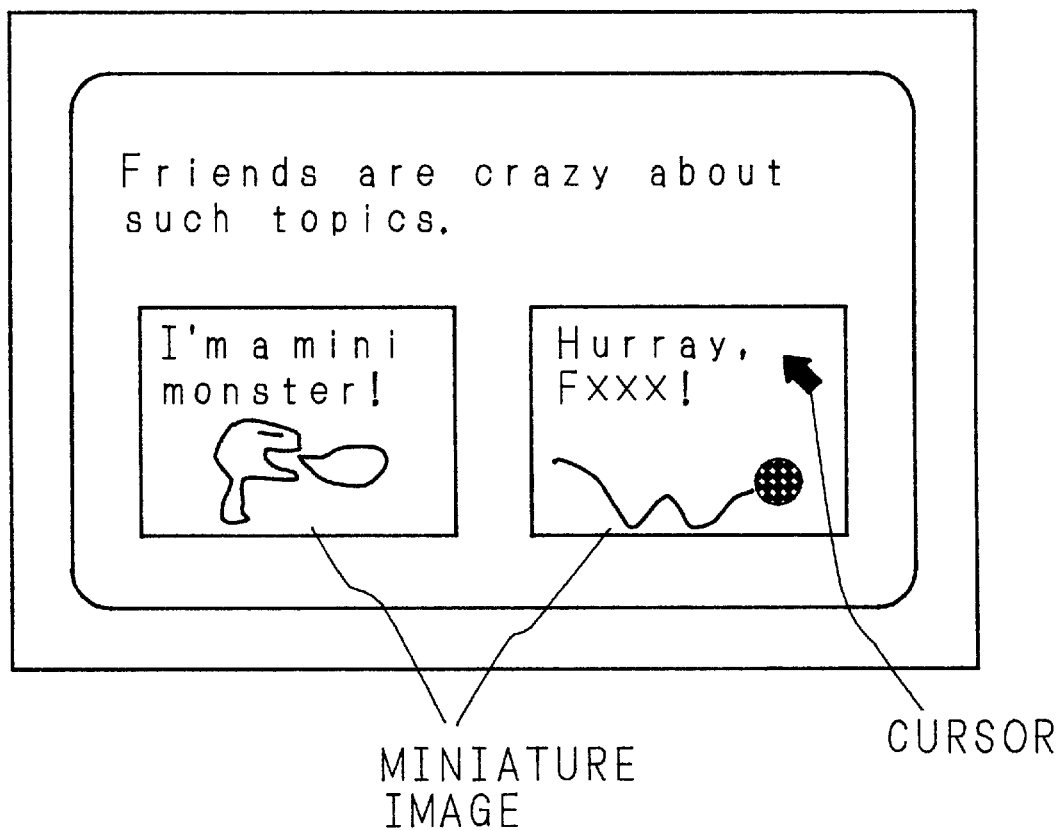
FIG. 11 is an example of screen display of Embodiment 2.

Further, when the user selects the miniature image displayed as in FIG. 11 by clicking, for example, the main controller 101 of the client apparatus 100 judges which is the selected miniature image and transmits the news ID or mail ID corresponding to the selected miniature image to the server apparatus 200. The main controller 201 of the server apparatus 200 refers to the news information DB 208 or mail information DB 209 to fetch the news or mail corresponding to the selected miniature image from the news server 202 or the mail server 203 and transmit the fetched news or mail to the client apparatus 100.

In the above embodiment, explanation is given on the client/server type electronic communication system, but the invention is also applicable to the stand-alone type electronic communication system.

The DB interpretation part 106 may be provided on the server apparatus 200.

Figure 12:
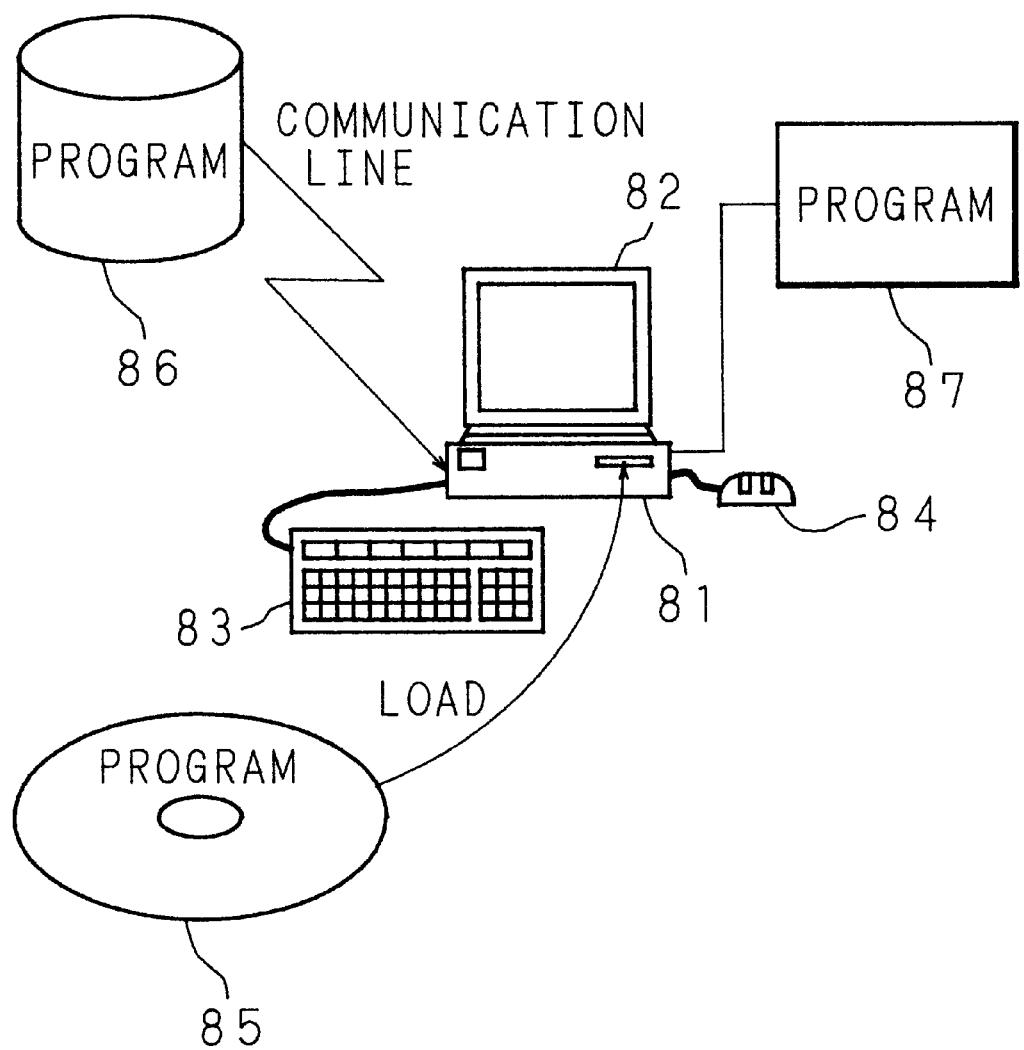
FIG. 12 is a schematic view of hardware constitution for realizing the system of the invention.

FIG. 12 is a schematic view of the hardware constitution for realizing the system of the invention. This hardware comprises a personal computer 81 as a processing apparatus, a display 82 for displaying the character data, and a keyboard 83 and mouse 84 as input devices. The personal computer 81 loads the program for carrying out the processing as described above from the recording medium such as a portable type recording medium 85 such as a magnetic disk, CD-ROM or the like, a communication line memory 86 which can communicate a program with the personal computer 81 by wire or wireless provided at the center, or a processor side memory 87 like a RAM or hard disk provided on the personal computer 81.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electronic communication system comprising:
   first memory means for storing attribute information related with an object which executes the electronic communication;
   second memory means for storing a sentence composition pattern and sentence composition data for filling the attribute information in the composition pattern;
   message composition means for composing a message by obtaining the attribute information from the first memory means and the sentence composition pattern and sentence composition data from the second memory means and filling said attribute information in the sentence pattern; and
   an output device for outputting the message composed by the message composition means.

2. An electronic communication system according to claim 1, further comprising third memory means for storing information necessary for composing a sentence, wherein said message composition means has means for obtaining the sentence composition data corresponding to said composition pattern of the sentence out of the information stored by the third memory means to prepare a message by filling said sentence composition data in the composition pattern of the sentence.

3. An electronic communication system comprising:
   first memory means for storing attribute information of an object which executes the electronic communication;
   second memory means for storing the information substance;
   third memory means for storing attribute information of said information substance including identification information of said information substance;
   message composition means for obtaining the identification information of the information substance having relationship with the attribute information of said object from the third memory means;

an output device for outputting the identification information obtained by the message composition means;

control means for accepting a selection to the outputted identification information and obtaining the information substance corresponding to the selected identification information from the second memory means.

4. A recording medium readable by a computer, comprising:

attribute information related with an object which executes electronic communication;

a sentence composition pattern and sentence composition data for filling the attribute information in the composition pattern;

program code means for causing said computer to prepare a message by obtaining the attribute information, sentence composition pattern and sentence composition data to fill the attribute information in the sentence pattern; and program code means for causing said computer to output the prepared message.

5. A system for executing electronic communication by utilizing a computer system, comprising:

first memory means for storing in advance a plurality of specifying information incidental to an individual or group which utilizes said communication system;

second memory means for storing in advance plural kinds of composition pattern of a messages to be presented to the individual or group which utilizes said communication system;

message composition means for preparing a predetermined message by filling the specified information from said first memory means in the composition pattern of the message obtained from the second memory means according to information which indicates the condition under the execution of the electronic communication; and an output device for presenting the prepared message.

* * * * *